United States Patent
Mize

[15] 3,693,145
[45] Sept. 19, 1972

[54] ANTI-CAPSIZING WARNING SYSTEM FOR VEHICLES

[72] Inventor: Lawrence A. Mize, 161 Minorca Way, Millbrae, Calif. 94030

[22] Filed: July 23, 1970

[21] Appl. No.: 57,650

[52] U.S. Cl. ........................... 340/52 R, 200/61.52
[51] Int. Cl. ............................................. H01h 35/02
[58] Field of Search.340/52 R, 58; 200/61.22, 61.45, 200/61.52

[56] References Cited

UNITED STATES PATENTS

| | | |
|---|---|---|
| 3,363,231 | 1/1968 | Grosgebauer et al....340/58 X |
| 2,957,058 | 10/1960 | Trott ..................... 200/61.22 |
| 3,531,766 | 9/1970 | Henzel .................... 340/52 H |
| 2,426,360 | 8/1947 | Larison ................... 200/61.22 |
| 2,499,669 | 3/1950 | Murat ..................... 200/61.22 |

Primary Examiner—Alvin H. Waring
Attorney—Townsend and Townsend

[57] ABSTRACT

An anti-capsizing warning system for vehicles comprising a sending unit mounted to the frame of the vehicle adjacent an axle thereof for completing an electrical circuit to energize a warning device disposed near the operator of the vehicle in response to an increase in the spacing between the axle and the frame of the vehicle beyond a predetermined level. The sending unit may preferably comprise one or more lever actuated microswitches and a flexible member or cable interconnecting the actuating lever of the microswitches and the axle. A second sending unit may be placed at the other end of the axle, and may be wired in parallel with the first sending unit, so that the warning device will be suitably actuated in response to the tipping of the vehicle in either direction.

9 Claims, 4 Drawing Figures

PATENTED SEP 19 1972 3,693,145
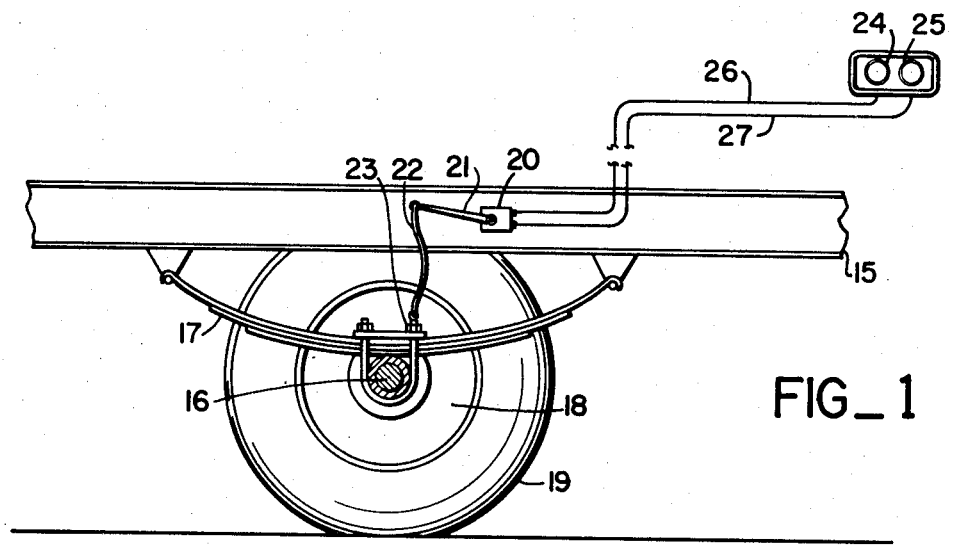
FIG_1
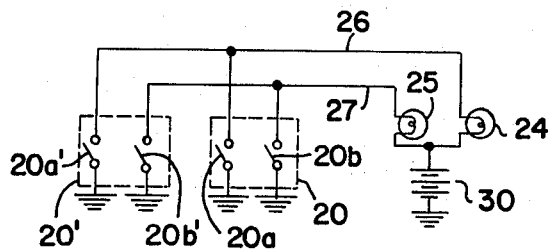
FIG_2
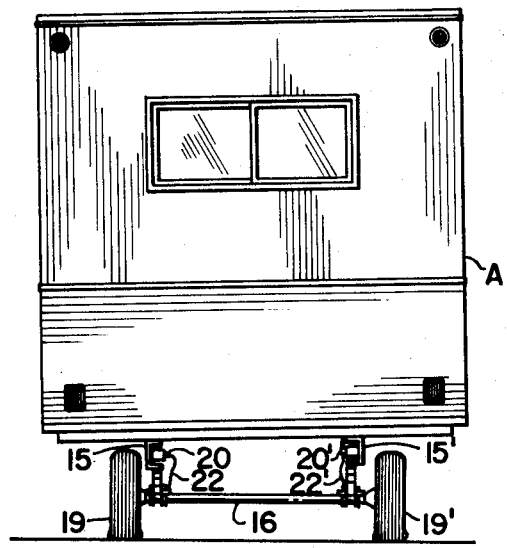
FIG_3a
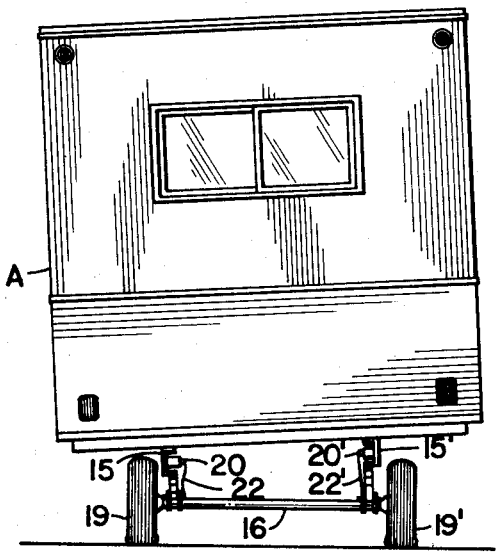
FIG_3b
INVENTOR.
LAWRENCE A. MIZE
BY
*Townsend and Townsend*
ATTORNEYS

ANTI-CAPSIZING WARNING SYSTEM FOR VEHICLES

This invention relates to an anti-capsizing warning system for vehicles.

When a vehicle negotiates a turn, centrifugal forces imparted to it tend to cause a shift in weight towards the outer side of the vehicle, and thus a tipping action. Of course, these forces are dependent upon the speed of the vehicle and the radius of the turn. It is often difficult for the driver to determine when the centrifugal forces are approaching a dangerous level sufficient to capsize the vehicle. Consequently, vehicles occasionally capsize or the driver will drive at a speed lower than optimal as an extra safety precaution. In addition, tipping forces sufficient to cause capsizing might occur as a result of high winds or road hazards.

Applicant has found that in a sprung vehicle, these tipping forces produce a loss in weight on the inside wheel, causing the spring associated therewith to decompress in proportion to this loss in weight. Furthermore, such decompression is accompanied by a proportional increase in the spacing between the frame and axle of the vehicle over the inside wheel.

Accordingly, it is an object of the present invention to provide an anti-capsizing warning system for vehicles in which a warning for the operator is produced in response to the decompression of one of the springs of the vehicle.

Another object of the present invention is to provide an anti-capsizing warning system for vehicles in which a warning for the operator is produced in response to an increase in the spacing between the frame and axle of the vehicle adjacent one of the wheels thereof.

These objects are met in accordance with the present invention by providing an anti-capsizing warning system having a sending unit mounted to the frame of the vehicle above one of the wheels thereof, and responsive to an increase in the spacing between the frame and the axle. The sending unit may preferably comprise one or more lever actuated microswitches adapted to energize one or more warning devices disposed adjacent the driver of the vehicle. Each of the plural microswitches may be adapted to be actuated upon varying degrees of loss in weight on the wheel, and may be connected to a different warning device so as to produce different warnings representative of different degrees of danger. Furthermore, a second sending unit may be employed in association with the other end of the axle, and may be wired in parallel with the first sending unit, so that the warning devices will be energized in response to tipping of the vehicle in either direction.

The foregoing is advantageous in that the provision of an anti-capsizing warning system according to the present invention enables the driver of the vehicle to drive at optimal speed, without fear of capsizing the vehicle as suitable warnings will be produced prior thereto, permitting the driver to take appropriate corrective action. Furthermore, as will be more readily apparent hereinafter, the anti-capsizing warning system according to the present invention is relatively simple and inexpensive, and may be readily added to an existing vehicle.

These and other objects, features and advantages will be more readily apparent from the following detailed description of the invention, with reference to the accompanying drawings, wherein:

FIG. 1 is a diagrammatic view of an anti-capsizing warning system for vehicles according to the present invention;

FIG. 2 is a schematic diagram of the apparatus depicted in FIG. 1; and

FIGS. 3a and 3b are rear views of a vehicle incorporating the apparatus depicted in FIG. 1.

Referring initially to FIG. 1, there is shown a frame member 15 of a vehicle. Frame member 15 is mounted to an axle 16 by a leaf spring 17. Axle 16 is rotatably connected to a wheel 18 upon which a tire 19 is mounted. The foregoing vehicle suspension is old and is described for illustrative purposes only, it being understood that the anti-capsizing warning system according to the present invention may be readily adapted for use with other types of vehicle suspension systems.

A sending unit 20, having an actuating lever 21, is attached to frame member 15 with the end of actuating lever 21 above axle 16. Sending unit 20 comprises one or more microswitches having actuating lever 21 common thereto. Each of the plural microswitches may be adapted to be actuated upon varying amounts of pivotal movement of actuating lever 21.

The end of actuating lever 21 is attached to one end of a flexible member or cable 22. The other end of cable 22 is attached to axle 16, for example, by securing the end of cable 22 to a U-bolt 23, which is employed to mount axle 16 to leaf spring 17. In this manner, actuating lever 21 will be pivoted in accordance with the variation in the spacing between axle 16 and frame member 15. In particular, a shift in weight of the vehicle, such as that produced by centrifugal forces imparted to the vehicle during turning, may cause the load on tire 19 to decrease. This, in turn, will cause spring 17 to decompress, resulting in an increase in the spacing between axle 16 and frame 15. Such an increase will cause the slack in cable 22 to be taken up, followed by the pivoting of actuating lever 21.

In a preferred embodiment of the present invention, sending unit 20 comprises a pair of microswitches 20a and 20b, adapted to be actuated upon varying degrees of pivotal movement of actuating lever 21. In particular, microswitch 20a may be adapted to be actuated upon a degree of pivotal movement of actuating lever 21 corresponding to a 35 percent loss of weight on axle 16 adjacent tire 19. Similarly, microswitch 20b may be adapted to be actuated upon a degree of pivotal movement of actuating lever 21 corresponding to a 70 percent loss of weight on axle 16 adjacent tire 19. Of course, the particular levels of loss in weight necessary to actuate microswitches 20a or 20b may be readily adjusted by varying the length of cable 22, and the relationship between switches 20a and 20b and actuating lever 21.

Sending unit 20 is electrically connected to a pair of warning devices 24 and 25 by a pair of wires or leads 26 and 27, respectively. In particular, microswitch 20a is suitably connected to warning device 24 by lead 26 so that warning device 24 will be energized upon actuation of microswitch 20a. Similarly, warning device 25 is connected to microswitch 20b via lead 27, so that warning device 25 will be energized upon actuation of microswitch 20b. In this manner, the energization of warning device 24 will indicate to the operator of the vehicle the existence of a loss of weight of at least 35 percent on one of the wheels of the vehicle, and thus a somewhat dangerous condition. Similarly, the energization of warning device 25 will indicate to the operator a loss of weight of at least 70 percent on one of the wheels of the vehicle, and thus the existence of a more dangerous condition. Accordingly, warning device 24 may be regarded as a caution indicator, and may thus comprise an amber warning light, while warning device 25 represents a danger condition, and may thus comprise a red danger light.

Referring to FIG. 2, wherein warning devices 24 and 25 are depicted as lamps 24 and 25, the electrical circuitry of the anti-capsizing warning system according to the present invention will now be described. One terminal of each of lamps 24 and 25 are connected to the hot lead of the vehicle electrical supply, herein depicted as a battery 30. As is convention in vehicular electrical wiring, the other terminal of battery 30 is connected to the chassis or ground of the vehicle. The other terminals of lamps 24 and 25 are respectively connected to leads 26 and 27. As previously referred to, microswitches 20a and 20b of sending unit 20 are respectively connected to leads 26 and 27. Microswitches 20a and 20b are normally open, and are adapted to connect leads 26 and 27 to the chassis upon actuation. It is thus apparent that actuation of microswitch 20a or 20b will complete the electrical circuit to lamps 24 or 25, via leads 26 or 27, thus resulting in the energization and illumination of lamps 24 or 25 as referred to hereinbefore. As is apparent from FIG. 2, additional sending units may be connected in parallel with sending unit 20. Specifically, there is shown a sending unit 20' having microswitches 20a' and 20b'. Microswitch 20a' is connected to lead 26 and microswitch 20b' is connected to lead 27 in a manner similar to, and in parallel with, microswitches 20a and 20b. In this manner, plural sending units may be employed in conjunction with varying wheels and axles of the vehicle, the plural sending units cooperating with the common warning devices 24 and 25 to alert the driver of a loss in weight on any of those wheels.

Referring to FIG. 3a, the anti-capsizing warning system according to the present invention is depicted in conjunction with a trailer A. Sending units 20 and 20' are mounted to frame members 15 and 15', respectively, above the ends of axle 16. Accordingly, sending unit 20 will be responsive to the loss in weight on wheel 19, while sending unit 20' will be responsive to the loss in weight on wheel 19'. Thus, the anti-capsizing warning system will be responsive to tipping of trailer A in either direction. In operation, the movement of trailer A will be accompanied by variations in the load on wheels 19 and 19' in accordance with shifts in weight caused by centrifugal forces encountered in turning, wind or road conditions. As referred to hereinbefore, such loss in weight causes a decompression of the springs of the trailer A. So long as such shifts in weight do not exceed a 35 percent loss in weight on wheels 19 or 19', the anti-capsizing warning system will remain inactive, and will thus not interfere with the normal operation of the vehicle. This is apparent from FIG. 3a, in which a slight tilt of trailer A is depicted. Although the tilt depicted results in a loss of weight on wheel 19', sending unit 20' will not be actuated as the loss of weight has not taken up the slack in cable 22', and thus does not exceed the predetermined actuating level of microswitch 20a, for example, a 35 percent loss in weight.

Referring to FIG. 3b, there is depicted the operation of the anti-capsizing system according to the present invention when the loss in weight on one of the wheels of the vehicle exceeds the predetermined safety or actuating level. Specifically, trailer A is depicted in FIG. 3b, tilting to the left a sufficient amount to cause a loss in weight on wheel 19' of over 35 percent. As is apparent from FIG. 3b, the increase in spacing between frame member 15' and axle 16 has taken up the slack in cable 22', resulting in the pivoting of the actuating lever of sending unit 20'. This, in turn, causes the actuation of microswitch 20a' and the energization of warning device 24. If the operator of the vehicle, thus alerted, takes appropriate corrective measures, trailer A will be righted, and warning device 24 will be extinguished by the deactuation of microswitch 20a'.

If, however, the tilting or tipping of trailer A increases, further pivotal movement of the actuating lever of sending unit 20' will occur, causing microswitch 20b' to be actuated. This, in turn, will result in the energization of warning device 25, thus indicating to the operator of the vehicle that the vehicle is in imminent danger of capsizing.

Accordingly, the anti-capsizing warning device according to the present invention functions to warn the operator of impending danger of capsizing due to a shift in weight of the vehicle as might be encountered in turning, or due to wind or road conditions. Furthermore, it is apparent that the apparatus according to the present invention may be readily added to an existing vehicle, with the degree or degrees of the danger of capsizing upon which warnings are to be produced being readily pre-settable upon installation.

While a particular embodiment of the present invention has been shown and described, it is to be understood that modifications or adaptations may be made without departing from the spirit and scope of the invention, as set forth in the claims.

What is claimed is:

1. An anti-capsizing warning system for a vehicle having spring mounted wheels, the spring mounting of at least one of said wheels on each side of said vehicle being independent of the other wheels on the same one side of said vehicle, comprising first sending means for producing an electrical signal solely in response to an increase in the spacing between the frame of said vehicle and one of said at least one wheels of said vehicle beyond a predetermined level and an electrically operated warning device responsive to said electrical signal.

2. Apparatus according to claim 1 wherein said first sending means comprises a lever actuated microswitch mounted to the frame of said vehicle adjacent the end of the axle of said vehicle associated with said wheel and a flexible member connecting the actuating lever of said microswitch and said axle.

3. Apparatus according to claim 1 comprising second sending means for producing an electrical signal in response to an increase in the spacing between the frame of said vehicle and another of said at least one wheels of said vehicle electrically connected in parallel with said first sending means, said another wheel being at the opposite end of the axle carrying said one wheel.

4. An anti-capsizing warning system for a vehicle having spring mounted wheels, the spring mounting of at least one of said wheels on each side of said vehicle being independent of the other wheels on the same one side of said vehicle, comprising first sending means for producing an electrical signal solely in response to an increase in the spacing between the frame of said vehicle and one of said at least one wheels of said vehicle beyond a predetermined level and an electrically operated warning device responsive to said electrical signal.

5. Apparatus according to claim 4 wherein said first sending means comprises a plurality of lever actuated microswitches mounted to the frame of said vehicle adjacent the end of the axle of said vehicle associated with said wheel, said microswitches having a common actuating lever, said microswitches being adapted to actuate upon varying degrees of pivotal movement of said actuating lever, and a flexible member connecting said actuating lever and said axle.

6. Apparatus according to claim 5 wherein said warning means comprises a plurality of electrically-operated warning devices, each of said warning devices being electrically connected to one of said microswitches.

7. Apparatus according to claim 4 wherein said first sending means comprise a pair of lever-actuated microswitches mounted to the frame of said vehicle adjacent the end of the axle of said vehicle associated with said wheel, said microswitches having a common actuating lever, said microswitches being adapted to actuate upon different degrees of pivotal movement of said actuating lever, and a flexible member connecting said actuating lever and said axle.

8. Apparatus according to claim 7 wherein said warning means comprises a pair of electrically-operated warning devices, each of which is electrically connected to one of said microswitches.

9. Apparatus according to claim 4 comprising second sending means for producing electrical signals in response to an increase in the spacing between the frame of said vehicle and another of said at least one wheels of said vehicle electrically connected in parallel with said first sending means, said another wheel being at the opposite end of the axle carrying said one wheel.

* * * * *